Sept. 21, 1948.   G. E. DAKE ET AL   2,449,738
OIL EMULSION TREATER
Filed April 14, 1944   3 Sheets-Sheet 2
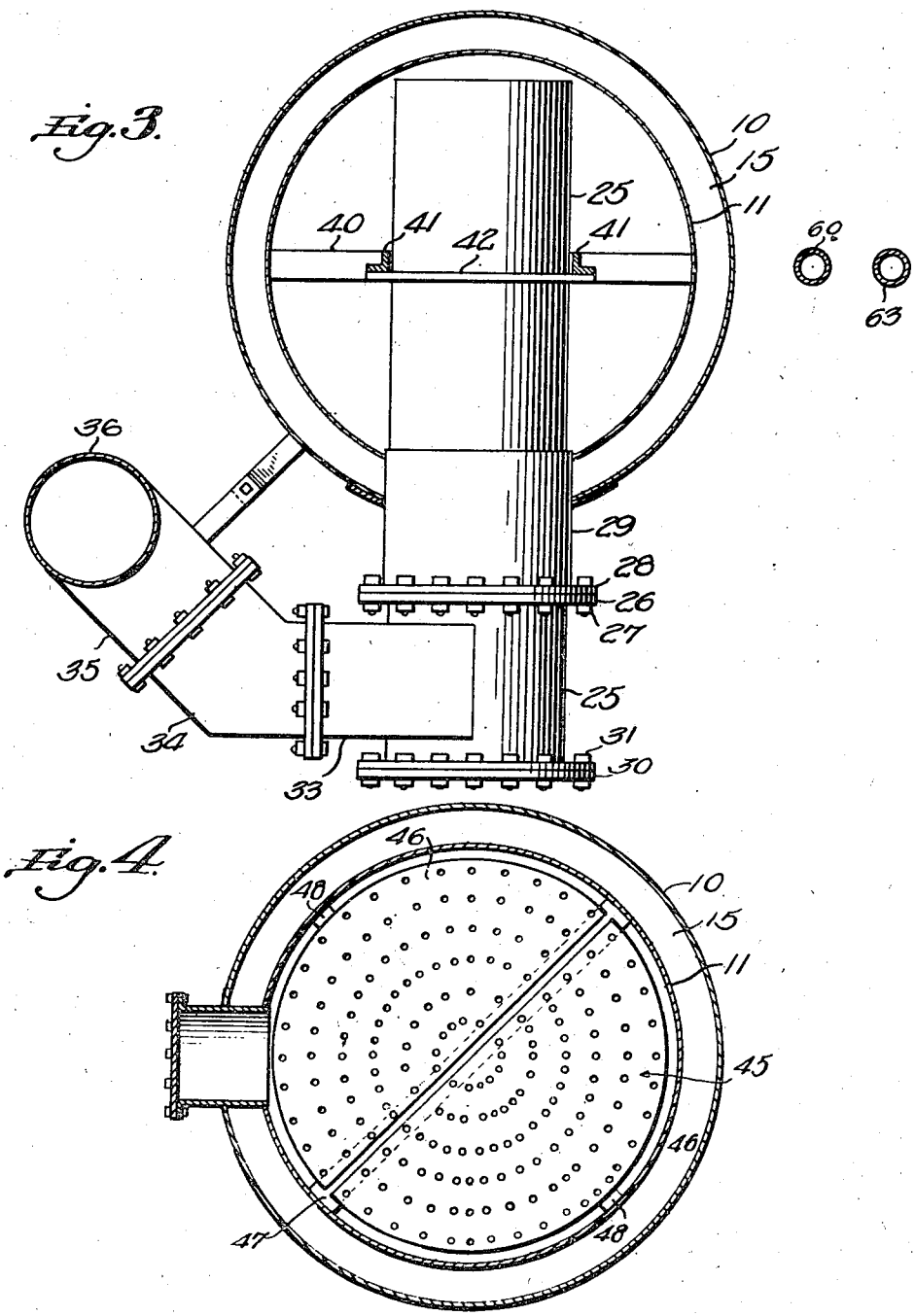
INVENTOR
GEORGE E. DAKE
JOE A. LYNE
By
ATTORNEYS Sept. 21, 1948.  G. E. DAKE ET AL  2,449,738
OIL EMULSION TREATER
Filed April 14, 1944  3 Sheets-Sheet 3
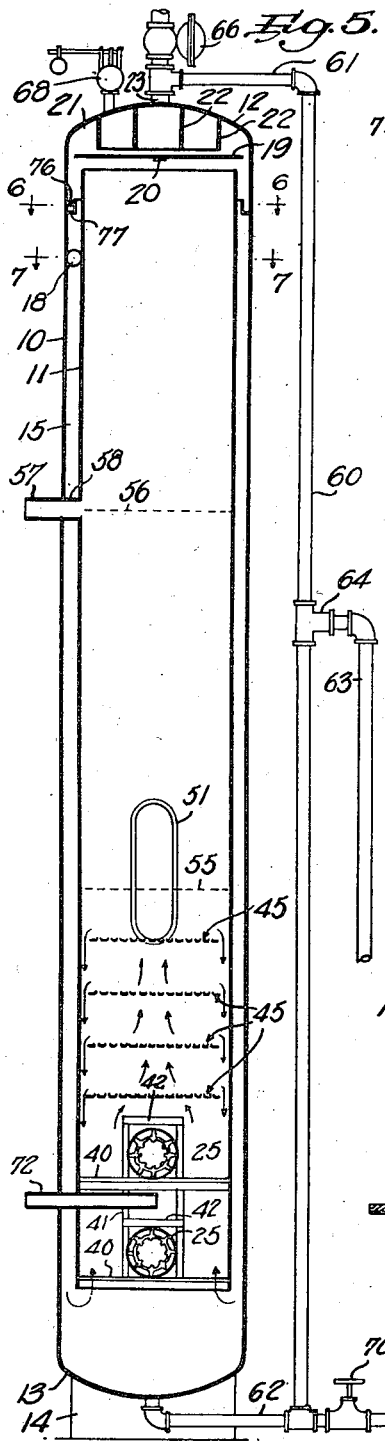
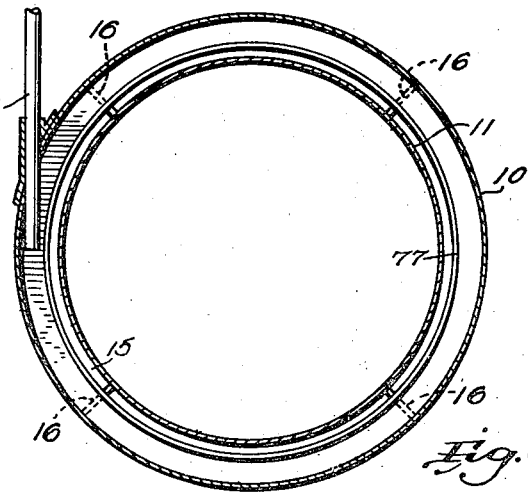
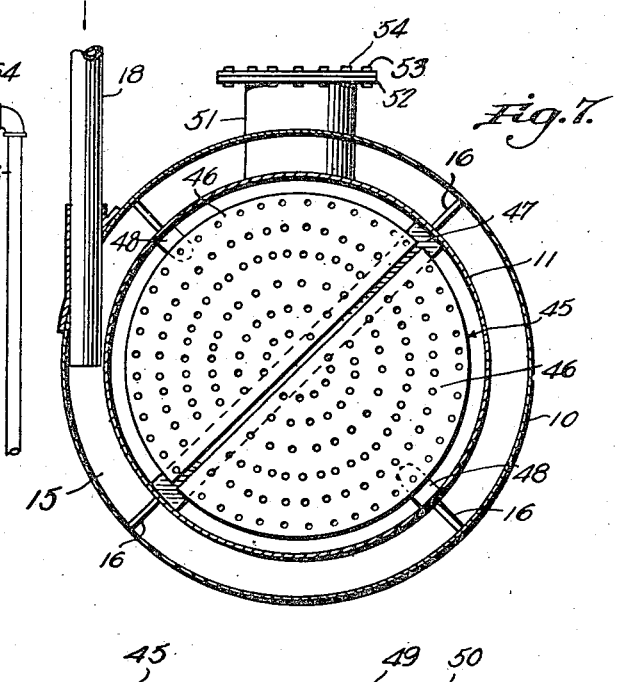
INVENTOR
GEORGE E. DAKE
JOE A. LYNE
ATTORNEYS Patented Sept. 21, 1948

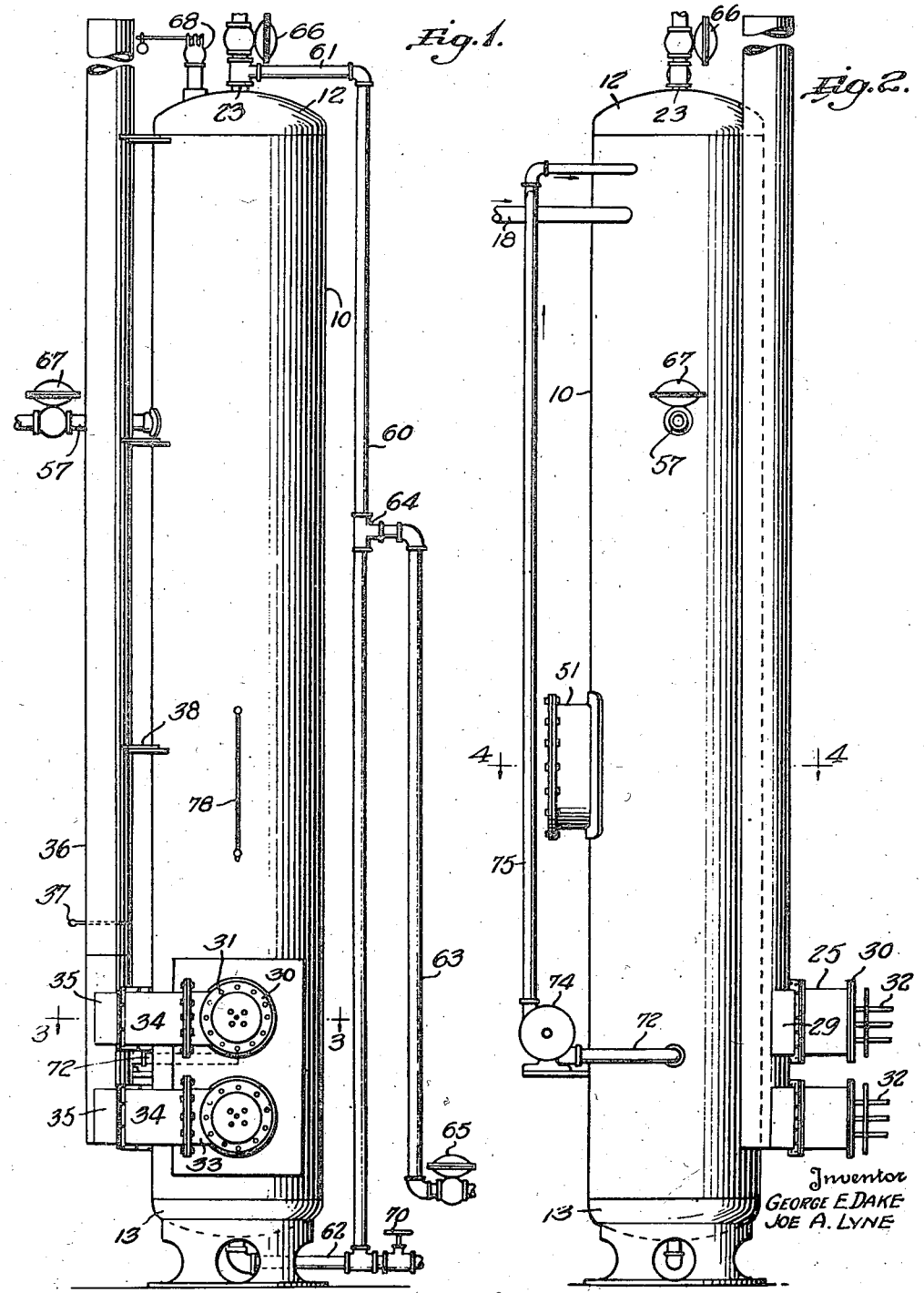

2,449,738

UNITED STATES PATENT OFFICE 2,449,738

OIL EMULSION TREATER

George E. Dake, Parkersburg, W. Va., and Joe A. Lyne, Houston, Tex., assignors to The Parkersburg Rig & Reel Company, Parkersburg, W. Va., a corporation of West Virginia Application April 14, 1944, Serial No. 531,106

18 Claims. (Cl. 210—52.5)

This invention relates to a continuous flow oil emulsion treater.

An important object of the invention is to provide a novel type of continuous flow heater wherein a particularly efficient arrangement of elements is employed for the separation of water from oil within the apparatus.

A further object is to provide a novel apparatus of this type wherein the incoming well fluid is efficiently distributed in the apparatus adjacent the inlet to increase the efficiency of the apparatus, the separation of gas, oil and water commencing immediately upon the introduction of the well fluid.

A further object is to provide a treater of the character referred to having inner and outer elongated preferably concentric casing members between which the well fluid is introduced at a substantial distance from the bottom of the apparatus, the initial separating steps occurring in the annular space between the casings to increase the efficiency of the final separating action which takes place within the inner casing.

A further object is to provide such an apparatus having heating means within the inner casing member adjacent the bottom thereof to effectively heat the water and the emulsions of oil and water passing upwardly into the bottom of the inner casing from the space between the two casings, the downwardly flowing fluids in the annular space between the two casings serving as a heat insulator to minimize loss of heat from the interior of the apparatus and to absorb heat passing radially outwardly from the inner casing member to preheat the fluids flowing downwardly in the annular space referred to.

A further object is to provide a novel type of baffle means within the inner casing to assist in the effective separation of the oil from the water and to maintain an effective thermo-syphonic movement of fluids in the lower portion of the inner casing member.

A further object is to provide an arrangement of baffles, in conjunction with a manhole in the apparatus, whereby the baffles may be easily inserted, and easily removed for the purpose of cleaning, etc.

A further object is to provide a novel arrangement of heating tubes for the efficient and uniform heat transfer to the fluids passing upwardly around the tubes within the inner casing member.

A further object is to provide an arrangement of parts whereby the flow of all fluids in the apparatus is completely and automatically controlled.

A further object is to provide a water cycling means for returning hot water from near the bottom of the apparatus to a point within the annular space between the two casing members to thus provide an additional hot water wash for the well fluids, where desirable.

A further object is to provide novel means for maintaining the level of separated water within the apparatus approximately at the same position at all times and to drain off excess water without the use of a float controlled or similar mechanism.

Other objects and advantages of the invention will become apparent during the course of the following description.

In the drawings we have shown one embodiment of the invention. In this showing,

Figure 1 is a front elevation of the apparatus,

Figure 2 is a side elevation of the same,

Figure 3 is a section on line 3—3 of Figure 1, parts being shown in elevation,

Figure 4 is a similar view on line 4—4 of Figure 2,

Figure 5 is a central vertical sectional view through the apparatus looking in the same direction as Figure 1, parts being shown in elevation, Figure 6 is an enlarged horizontal sectional view on line 6—6 of Figure 5, Figure 7 is a similar view on line 7—7 of Figure 5, and Figure 8 is an enlarged fragmentary sectional view of a portion of one of the horizontal baffles.

Referring to the drawings, the numerals 10 and 11 indicate a pair of casing members, the former of which may be designated as the shell and the latter of which may be termed the inner cylinder. The shell 10 is provided with an upper head 12 and a bottom head 13. These heads are preferably integrally welded to the shell and the apparatus as a whole is supported by a preferably welded steel base 14.

The casing members 10 and 11 are preferably concentric with each other, the cylinder 11 being of somewhat smaller diameter than the shell 10 to provide an annular space 15 for a purpose to be described. The cylinder 11 extends throughout the greater portion of the height of the shell 10 as shown in Figure 2 and is supported with respect to the shell by suitably welded braces 16 (Figure 7). The cylinder 11 is placed in position in the shell and welded to the braces 16 before the heads 12 and 13 are welded in position as will be obvious.

The well fluid is introduced into the annular space 15 near the upper end thereof by a pipe 18 extending tangentially into the space 15 as shown in Figure 7. The tangential introduction of the well fluid is highly desirable. Because of the nature of the well fluids, some of the water will be free while the remainder will be in an emulsion with the oil. The tangential introduction of the fluid serves to uniformly distribute the mixture of fluids around the annular space so that the separating action can immediately and uniformly commence, as will be referred to later.

The inner cylinder 11 is open at both ends for direct communication with the interior of the shell 10. Above the upper end of the cylinder 11 a horizontal preferably solid baffle 19 is arranged, this baffle being supported by any suitable means such as clips 20 welded to the shell 10. The baffle 19 is of somewhat smaller diameter than the shell 10 for the passage of gases therearound into the gas chamber 21 above the baffle 19. A pair of concentric cylindrical baffles 22 are welded at their upper ends to the head 12 and extend downwardly to a point slightly spaced above the baffle 19. Upwardly flowing gases from the space 15 and from the interior of the cylinder 11 wipe over and are guided radially by the baffle 19 to pass around the edge of this member. The gases then flow over and wipe against the concentric baffles 22, and then flow from the chamber 21 through a gas outlet pipe 23.

The well fluid introduced through the pipe 18 flows downwardly through the annular space 15, thence around the lower end of the cylinder 11 to move upwardly into such cylinder as indicated by the arrows at the lower end thereof in Figure 5, except that free water reaching the lower end of the annular space 15 may remain in the bottom of the shell 10.

The mixture flowing upwardly into the bottom of the cylinder 10 is efficiently heated. For this purpose heating tubes 25 are provided. These tubes preferably are a part of a heating mechanism of the type shown in the copending application of George E. Dake, filed July 27, 1943, Serial No. 496,357, now Patent 2,387,883, and form no part, per se, of the present invention. Each tube 25 extends transversely of the apparatus and externally of the shell 10 it is provided with an annular flange 26 bolted as at 27 to an annular flange 28 carried by a sleeve 29. This sleeve extends through both of the casing members 10 and 11 as clearly shown in Figure 3 and is welded to both of these members to form leak-proof joints. Each tube 25 is provided at its outer end with a plate 30 bolted thereto as at 31 and carrying the necessary means for supplying fuel to the interior of the inner end of the tube 25 and the elements arranged therein as shown in the copending application referred to. The fuel employed is preferably gas, and the fuel inlet pipes are generally indicated in Figure 2 by the numeral 32. Each heating unit is provided with a transversely extending outlet pipe 33 for the products of combustion, and this pipe is connected by suitable pipe sections 34 and 35 to a stack 36 (Figures 1 and 3). This stack may be provided with a suitable damper 37 and may be suitably supported with respect to the shell 10 by brace members 38 welded to the shell 10 and to the stack 36.

Any suitable means may be employed for effectively supporting the inner end of each tube 25 within the cylinder 15. For this purpose a transverse structural member 40 (Figures 3 and 5) may be provided for each tube 25, the members 40 preferably extending diametrically across the cylinder 11 and being welded at their ends thereto. The tubes 25 may be arranged between spaced vertically extending structural members 41, and between the members 41 may be arranged transverse hold-down structural members 42. Thus the heating members will be effectively supported in position by means which will not substantially interfere with the upward flowing of the emulsion and other fluids around the heating units.

A series of spaced horizontal baffle units is arranged above the heating units, each baffle unit being indicated as a whole by the numeral 45, these units being spaced one above the other as shown in Figure 5. Each of the baffle units is made up of a pair of complementary semicircular plate sections 46 having their adjacent edges supported by a transverse structural member 47 welded or otherwise secured to the inner surface of the cylinder 11. The outer edges of the sections 46 may be suitably supported by small angle clips or the like 48 also welded to the cylinder 11. Each of the baffle sections 46 is preferably formed of a flat steel plate stamped as shown in Figure 8 to provide openings 49 formed by up-turned roughened lips 50 resulting from the stamping operation. The upwardly moving well fluids flow through the openings 49, the water separating from the fluid settling on the baffle sections 46 and flowing downwardly around the periphery of each baffle unit 45, as indicated by the arrows in Figure 5. The upward flow of fluid is generally around the heating units and thence upwardly through the baffle units 45 in a slowly moving column of smaller diameter than the baffles, this upward flow coupled with the downward flow of water radially outwardly of the baffles maintaining a constant thermo-syphonic fluid circulation.

The baffles may be inserted and removed through a manhole tube 51 of vertically elongated cross-section as shown in Figure 5. The manhole tube extends through both of the casing members 10 and 11 and is welded to each of these members to form a leak-proof joint. The tube 51 is flanged as at 52 to be bolted as at 53 to a cover plate 54, a suitable gasket being arranged between the flange 52 and cover 54 to insure a perfectly leak-proof joint. The baffle units 45 are formed of complementary sections, as stated, and these sections may be readily separately introduced into the apparatus through the manhole 51, and removed from the apparatus through the same tube.

In an operation of the apparatus, the water is maintained approximately at the level indicated by the dotted line 55 and a substantial body of oil in a quiescent state is maintained above the water approximately to the level indicated by the line 56 (Figure 5). An oil outlet pipe 57 is connected to a suitable sleeve 58 extending through and welded to the shell members 10 and 11, the oil thus being taken off approximately at the level 56 referred to. The level of the oil will be determined by the position of the outlet pipe 57, of course, and the relative level of the water 55 will be determined automatically by means of an outside pipe column 60 having inwardly extending upper and lower pipe connections 61 and 62 respectively, the former of which is tapped into the gas outlet line 23. The lower pipe connection 62 is tapped into the bottom of the shell 10 as indicated in Figures 2 and 5. Intermediate the ends of the column 60 a pipe 63 is connected, and the position of this connection into the pipe 60 determines the level 55 of the water. It will be noted that the pipe 63 is connected into the pipe column 60 by an ordinary T connection 64, and the controlling of the water level is accomplished without the use of float controlled valve means or any similar mechanism. This feature will be referred to later.

The apparatus is adapted for use either at atmospheric pressure or superatmospheric pressure, the latter condition occurring when the well fluids flow into the apparatus under superatmospheric pressure. To maintain a proper pressure balance throughout the system suitable pressure control valves are employed. For example, the pipe 63, through which excess water passes from the system as it accumulates, is provided with a pressure regulating valve 65 while the gas outlet pipe 23 is provided with a similar valve 66. A similar valve 67 will be arranged in the oil outlet pipe 57. The purpose of the pressure regulating valves is solely to equalize the pressure on the well inlet 18 so that the operation of the system will be identical to its operation under atmospheric pressure, except that more gas will remain in solution in the oil. This, in fact, is the preferred operation of the apparatus. In order to positively prevent any dangerous pressure accumulations, a pressure release valve 68 communicates with the gas chamber 21.

For the purpose of draining the system, when desired, an outlet pipe 69 communicates with the pipe 62 leading to the bottom of the shell 10, and any suitable type of cutoff valve 70 is arranged in the pipe 69.

Means are provided for effecting an auxiliary cycling of hot water through the system when desired. A pipe 72 is tapped into the shell 10 (Figures 1 and 5), preferably at a point between the two heating devices, to receive relatively hot water therefrom, and this pipe leads to a pump 74 which may be of the centrifugal type as indicated in Figure 2. From the outlet side of the pump 74, a pipe 75 extends upwardly along the tank and has its upper end 76 extending tangentially through the shell 10 above the inlet pipe 18. The pipe 75 may be suitably bent or provided with proper fittings to extend over the inlet pipe 18.

The upper end of the pipe 75 has its discharge end 76 (Figure 5) arranged to discharge hot water into a rolled annular angle ring 77. The tangential arrangement of the water outlet 76 causes an even flow of water around the angle ring 77. This ring has its outer edge welded to the shell 10 and has its inner vertical flange of larger diameter than the cylinder 11 so that the water overflows the ring 77 and thence flows downwardly in the annular space 15 to mingle with the incoming well fluids.

The apparatus is preferably provided with a water level gauge 78 as shown in Figure 1. This gauge is conventional and need not be illustrated in detail, and it will be understood that it communicates with the interior of the cylinder 11 to indicate the level 55 of the water.

The operation of the apparatus is as follows:

Well fluids consisting of gas, oil; free water and emulsions of oil and water are introduced tangentially through the pipe 18 (Figure 7) into the annular space 15. The fluids are thus given a rotary motion to insure an even distribution and uniform downward flow of the fluid throughout the circumference of the space 15. As the fluids are introduced into this space, the relatively large surface area at the top of the cylindrical column of fluid in the space 15 permits the ready escape of any free gas.

The gas rises and travels toward the gas outlet and is required to pass through the relatively small space between the horizontal baffle 19 and the shell 10. Any gases rising from the surface of the oil within the cylinder 10 flow into contact with the baffle 19 and thence radially outwardly thereover. All of the gas then passes around the peripheral edge of the baffle 19, and thence past the edges of the cylindrical baffles 22. As each obstruction to the flow of the gas is encountered, the gas is subjected to a wiping action and any fluid carried over by the gas is picked up and returned by gravity to the interior of the apparatus.

It will be appreciated that the apparatus is of substantial size and the space 15 is of substantial area. Thus the downward flow of the well fluids in this space is slow. However, free water, which is the heaviest constituent of the well fluids, flows downwardly more rapidly than the oil and emulsion constituents. Thus the latter constituents flow downwardly quite slowly until they reach the water space within the bottom of the shell 10.

In the operation of the apparatus it will be apparent that the heating devices will be in operation to maintain surrounding fluids, mostly water, at all times in a heated condition. The well fluids flowing upwardly through the lower portion of the cylinder 11 will be heated by passing through the hot water in the lower portion of the cylinder 11. Some of the heat of the fluids in the cylinder 11 will be conducted outwardly therethrough. The fluids passing downwardly through the annular space 15 are relatively cool and they form an insulating medium against the substantial loss of heat from the interior of the apparatus. The fluids in the space 15 absorb heat as they move downwardly, thus effecting a conservation of heat. It will be apparent that the fluids as they reach the bottom portion of the shell 10 are thus somewhat preheated and accordingly less heat is required by the heating means to raise the fluids within the cylinder 10 to the proper temperature.

The water space in the present apparatus extends upwardly within the cylinder 11 approximately to the level previously referred to and indicated by the numeral 55. This level is slightly above the uppermost baffle unit 45. The circulation of fluids through the space up to the level 55 is caused by a combination of differences in specific gravities of the fluids and a thermosyphonic flow. This flow is generally upwardly around the heater tubes through the central portion of the cylinder 11 and thence downwardly around the inner circumference of the cylinder 11.

As the oil and emulsion move upwardly within the inner cylinder they flow through the body of water and over the heating tubes and are thus evenly heated and distributed. In flowing upwardly through the water the fluids are thoroughly washed, and in passing through the small relatively rough-edged openings 49 of the baffle units 46, the fluids are further distributed and divided. Water progressively separates from the oil and emulsion and settles on the baffle units 45, and as it accumulates the water flows radially outwardly over the baffles and thence downwardly over the baffle edges thereof, as indicated by the arrows in Figure 5.

As a result of the actions referred to, the emulsion rising above the uppermost baffle is so conditioned that a large percentage of what entrapped water remains therein drops out. This water becomes a part of the large body of water through which the emulsion and oil must pass. There is a continuous thermo-syphonic flow of the free water with the emulsion, in the paths referred to above, and accordingly there is a constant washing of the emulsion.

The downward flow of water through the spaces between the peripheral edges of the baffle units 45 and the cylinder 11 forms a water seal which impedes any upward flow of emulsion and oil through these spaces. Accordingly all of the oil and emulsion is forced to flow upwardly through the baffles 45 to be subjected to the action of these units.

After the emulsion has passed through the uppermost baffle, and as it continues to flow upwardly through the remainder of the water space, practically all of the free water drops out and the fluid rising to the oil settling or storage space between the levels 55 and 56 is practically all free oil. In one typical form of the apparatus the distance between the levels 55 and 56 is eight feet. This provides a large volume of settling space in which the oil remains in a quiescent state, and any small amount of remaining water readily drops out.

As the oil accumulates it flows outwardly through the pipe 57. Any tendency for the level of the water to rise above the normal level 55 unbalances the column of fluid within the apparatus, the weight of the column between the bottom of the apparatus and the level 56 then becoming greater than the weight of the column of water between the bottom of the apparatus and the overflow T 64. Under such conditions the excess water will overflow through the pipe 63 until the normal balance of liquid levels is restored. It is obvious that the overflow connection for the pipe 63 is below the level 56 because of the lower specific gravity of the oil between the levels 55 and 56.

The present apparatus fully meets the primary requirements of an emulsion treater, namely, that the movement of the fluids be as slow as possible; that the emulsion be thoroughly washed in an excess of water while in a heated condition; and that there be ample provision for the settling out of water while the fluids are in a heated condition and in a relatively quiescent state. If the amount of water is insufficient for properly washing the oil, the pump 74 may be placed in operation to pump hot water from the lower portion of the apparatus into the annular space 15 in the manner stated. This recycling of water provides the excess water which may be needed for the proper washing of the oil.

The fluids flowing upwardly around the heating tubes are heated preferably to a maximum temperature of 160° F., this being the top temperature limit in most cases. Where a chemical is employed to assist in breaking the emulsions, a lower temperature will be used as is well known. It ordinarily requires from three to eight hours for a given particle of oil emulsion to pass from the inlet 18 to the bottom of the inner cylinder 11. The upward movement of the fluids within the cylinder 11 will be somewhat more rapid until the fluids reach the water level 55. The size of the apparatus is such that it handles a substantial volume of incoming well fluids.

In accordance with the foregoing description it will be apparent that the present apparatus is highly advantageous in use for a number of distinct reasons. The free water in the well fluids drops out freely during downward movement through the space 15, and the slow downward movement provides for the ready escape of the entrapped gases. Such downward movement also permits the absorption of heat before the fluids pass into the hot water wash within the bottom portion of the apparatus, thus minimizing heat losses and somewhat elevating the temperature of the fluids passing into the bottom of the cylinder 11 whereby less heat is required to raise the temperature of the fluids to the proper point. Thus the action of the apparatus begins with the entrance of the fluids into the apparatus and is advanced as they flow downwardly. Under most conditions it is not necessary to insulate the apparatus to any substantial extent because of the fact that heat ordinarily lost to the atmosphere is absorbed by the downwardly travelling fluids.

The arrangement of the heating tubes provides efficient and uniform heat transfer to the fluids, and throughout the upward flow, the emulsion is thoroughly washed by the water in the lower portion of the apparatus. The fluids are thoroughly distributed and divided by the baffle units 45, and the directions of flow of the fluids are completely controlled within the cylinder 11 by the baffles and by the fluid baffle formed by the downward flow of free water radially outwardly of the baffles 45.

Any gases which may arise from the hot oil in the inner cylinder will be cooled to a considerable extent before passing into the gas chamber 21 and mingling with the gases passing directly into this chamber from the well. Any condensation from these gases is directly returned to the interior of the apparatus.

The apparatus may be used for either atmospheric pressure or superatmospheric pressure operation as stated. For atmospheric pressure operation the pressure regulating valves of course need not be used. These valves are employed for operation under superatmospheric pressure solely to balance pressures in the system as necessitated by the pressures in the incoming well fluids.

Once the system has been placed in operation any rate of flow of water into the system as may be necessary for the proper washing of the oil may be provided by operation of the pump 74. Accordingly it is unnecessary to add any excess water from an outside source and the recycling of the water feeds the excess water to the system at an elevated temperature. The provision of the outside fluid column 60 and the take-off pipe 63 provides for the progressive draining off of water to maintain the proper water level in the apparatus. The tapping of the pipes 61 and 62 into the gas outlet and water drain-off pipes provides for the water level control means without having to tap into the body of the apparatus itself. The water level is controlled wholly without the use of float controlled or similar means.

It is to be understood that the form of our invention herewith shown and described may be taken as a preferred example of the same and that various changes in the shape, size and arrangement of parts may be resorted to without departing from the spirit of the invention or the scope of the subjoined claims.

We claim:

1. In an oil and water separator, a pair of substantially vertical casing units one within the other and spaced to form therebetween a vertically elongated fluid path, the inner casing unit having an open lower end communicating with the lower end of said fluid path for the flow of fluid therefrom into said inner casing unit, means for introducing a mixture of oil and water into said path at a point spaced a substantial distance above the lower end thereof, heating means within the lower portion of said inner casing unit, baffle means arranged in the inner casing unit above said heating means, an oil outlet communicating with the inner casing unit at a point spaced above the bottom thereof, and a water outlet communicating with said outer casing unit adjacent the bottom thereof.

2. In an oil and water separator, a pair of substantially vertical casing units one within the other and spaced from each other to form therebetween a vertically elongated fluid path, said inner casing unit having an open lower end communicating with the lower end of said fluid path for the flow of fluid therefrom into the lower end of said inner casing unit, means for introducing a mixture of oil and water into said path at a point spaced a substantial distance above the lower end thereof, heating means within the lower portion of said inner casing unit, a horizontal baffle plate arranged in said inner casing unit above said heating means and provided with openings, an oil outlet communicating with the inner casing unit at a point spaced above the bottom thereof, and a water outlet communicating with the outer casing unit adjacent the bottom thereof.

3. In an oil and water separator, a pair of substantially vertical casing units one within the other and spaced from each other to form therebetween a vertically elongated fluid path, said inner casing unit having an open lower end communicating with the lower end of said fluid path for the flow of fluid therefrom into the lower end of said inner casing unit, means for introducing a mixture of oil and water into said path at a point spaced a substantial distance above the lower end thereof, heating means within the lower portion of said inner casing unit, a horizontal baffle plate arranged in said inner casing unit above said heating means and provided with openings, said baffle plate having its edge slightly spaced throughout its periphery from said inner casing unit for the downward flow of separated water settling on said baffle unit, an oil outlet communicating with the inner casing unit at a point spaced above the bottom thereof, and a water outlet communicating with the outer casing unit adjacent the bottom thereof.

4. In an oil and water separator, a pair of substantially vertical casing units one within the other and spaced from each other to form therebetween a vertically elongated fluid path, said inner casing unit having an open lower end communicating with the lower end of said fluid path for the flow of fluid therefrom into the lower end of said inner casing unit, means for introducing a mixture of oil and water into said path at a point spaced a substantial distance above the lower end thereof, heating means within the lower portion of said inner casing unit, a horizontal baffle unit arranged in said inner casing above said heating means, said baffle unit having openings therethrough and having its edge slightly spaced from said inner casing unit for the downward flow of separated water settling on said baffle unit, an oil outlet communicating with said inner casing unit a substantial distance above said baffle unit, and means for predetermining the level of the water in said inner casing unit, said last named means including a water outlet communicating with said outer casing unit adjacent the bottom thereof.

5. In an oil and water separator, a pair of substantially vertical casing units one within the other and spaced from each other to form therebetween a vertically elongated fluid path, said inner casing unit having an open lower end communicating with the lower end of said fluid path for the flow of fluid therefrom into the lower end of said inner casing unit, means for introducing a mixture of oil and water into said path at a point spaced a substantial distance above the lower end thereof, heating means within the lower portion of said inner casing unit, a horizontal baffle unit arranged in said inner casing above said heating means, said baffle unit having openings therethrough and having its edge slightly spaced from said inner casing unit for the downward flow of separated water settling on said baffle unit, an oil outlet communicating with said inner casing unit a substantial distance above said baffle unit, a duct connected at its upper end to said outer casing unit adjacent the top and bottom thereof, and a water outlet pipe connected to said duct at such point in the height thereof as to maintain the level of the water in said inner casing unit at a point spaced above said baffle unit and below said outlet.

6. An oil and water separator comprising a vertically elongated external casing closed at its upper and lower ends, an internal casing supported within and spaced throughout its circumference from said outer casing, said inner casing having its lower end open for communication with the space between said casings, means for introducing fluids to be treated into said space at a point a substantial distance above the lower end of said inner casing, heating means within the lower portion of said inner casing, a baffle arranged above said heating means, an oil outlet communicating with said inner casing a substantial distance above said baffle, and means for draining water from the bottom of said outer casing, said last named means being constructed and arranged to maintain the level of the water in said inner casing above said baffle and below said oil outlet.

7. An oil and water separator comprising a vertically elongated external casing closed at its upper and lower ends, an internal casing supported within and spaced throughout its circumference from said outer casing, said inner casing having its lower end open for communication with the space between said casings, means for introducing fluids to be treated into said space at a point a substantial distance above the lower end of said inner casing, heating means within the lower portion of said inner casing, a baffle arranged above said heating means, an oil outlet communicating with said inner casing a substantial distance above said baffle, a duct externally of said outer casing and communicating at its ends with the interior of the top and bottom of such casing, and a water outlet connection tapped into said duct at such height therein as to maintain the level of the water in said inner casing above said baffle and below said oil outlet.

8. An oil and water separator comprising a vertically elongated external casing closed at its upper and lower ends, an internal casing supported within and spaced throughout its circumference from said outer casing, said inner casing having its lower end open for communication with the space between said casings, means for introducing fluids to be treated into said space at a point a substantial distance above the lower end of said inner casing, heating means within the lower portion of said inner casing, a horizontal baffle unit in said inner casing above said heating means, said baffle unit having a plurality of upwardly extending annular ridges defining openings therethrough and the peripheral edge of said baffle unit being spaced from said inner casing for the downward passage of water settling on said baffle unit, an oil outlet connected to said inner casing a substantial distance above said baffle unit, and means for withdrawing water from the bottom of said outer casing.

9. An oil and water separator comprising a vertically elongated external casing closed at its upper and lower ends, an internal casing supported within and spaced throughout its circumference from said outer casing, said inner casing having its lower end open for communication with the space between said casings, means for introducing fluids to be treated into said space at a point a substantial distance above the lower end of said inner casing, heating means within the lower portion of said inner casing, a horizontal baffle unit in said inner casing above said heating means, said baffle unit having a plurality of upwardly extending annular ridges defining openings therethrough and the peripheral edge of said baffle unit being spaced from said inner casing for the downward passage of water settling on said baffle unit, an oil outlet connected to said inner casing a substantial distance above said baffle unit, a duct externally of said outer casing and communicating with the interior thereof adjacent its top and bottom, and a water outlet pipe tapped into said duct at such height therein as to maintain the level of the water in said inner casing above said baffle unit and below said oil outlet.

10. An oil and water separator comprising a vertical cylindrical casing closed at its ends, a cylinder within said casing concentric therewith and open at its ends to the interior thereof, said cylinder being spaced from said casing to define an annular vertically elongated space, means for introducing fluids to be treated into said annular space at a point a substantial distance above the lower end of said cylinder, heating means within said cylinder adjacent the lower end thereof, mechanical baffle means above said heating means, an oil outlet communicating with the interior of said cylinder above said baffle means, and means for drawing off water from the bottom of said casing.

11. An oil and water separator comprising a vertical cylindrical casing closed at its ends, a cylinder within said casing concentric therewith and open at its ends to the interior thereof, said cylinder being spaced from said casing to define an annular vertically elongated space, an inlet pipe for fluids to be treated extending through said casing and into said annular space tangentially thereof a substantial distance above the lower end of said cylinder, heating means within said cylinder adjacent the lower end thereof, mechanical baffle means above said heating means, an oil outlet communicating with the interior of said cylinder above said baffle means, and means for drawing off water from the bottom of said casing.

12. An oil and water separator comprising a vertical cylindrical casing closed at its ends, a cylinder within said casing concentric therewith and open at its ends to the interior thereof, said cylinder being spaced from said casing to define an annular vertically elongated space, means for introducing fluids to be treated into said annular space at a point a substantial distance above the lower end of said cylinder, heating means within said cylinder adjacent the lower end thereof, a horizontal baffle unit in said cylinder above said heating means, said baffle unit being provided with a plurality of openings therethrough and having its periphery spaced from said cylinder for the downward flow of water settling on said baffle unit, an oil outlet communicating with said cylinder above said baffle unit, and means for drawing off water from the bottom of said casing.

13. An oil and water separator comprising a vertical cylindrical casing closed at its ends, a cylinder within said casing concentric therewith and open at its ends to the interior thereof, said cylinder being spaced from said casing to define an annular vertically elongated space, means for introducing fluids to be treated into said annular space at a point a substantial distance above the lower end of said cylinder, heating means within said cylinder adjacent the lower end thereof, a horizontal baffle unit in said cylinder above said heating means, said baffle unit being provided with a plurality of openings therethrough and having its periphery spaced from said cylinder for the downward flow of water settling on said baffle unit, an oil outlet communicating with said cylinder above said baffle unit, a duct externally of said casing and communicating with the top and bottom thereof, and a water outlet pipe communicating with said duct at such point as to maintain the level of the water in said cylinder above said baffle unit and below said oil outlet.

14. An oil and water separator comprising a vertically elongated external casing closed at its upper and lower ends, an internal casing supported within and spaced throughout its circumference from said outer casing, said inner casing having its lower end open for communication with the space between said casings, means for introducing fluids to be treated into said space at a point a substantial distance above the lower end of said inner casing, heating means within the lower portion of said inner casing, a baffle arranged above said heating means, an oil outlet communicating with said inner casing a substantial distance above said baffle unit, means for draining water from the bottom of said outer casing, said last named means being constructed and arranged to maintain the level of the water in said inner casing above said baffle and below said oil outlet, and means for pumping water from said external casing adjacent said heating means to the space between said casings adjacent the point of introduction of the fluids to be treated.

15. An oil and water separator comprising a vertical cylindrical casing closed at its ends, a cylinder within said casing concentric therewith and open at its ends to the interior thereof, said cylinder being spaced from said casing to define an annular vertically elongated space, means for introducing fluids to be treated into said annular space at a point a substantial distance above the lower end of said cylinder, heating means within said cylinder adjacent the lower end thereof, mechanical baffle means above said heating means, an oil outlet communicating with the interior of said cylinder above said baffle means, means for drawing off water from the bottom of said casing, a pipe connection communicating at one end with said casing adjacent said heating means and at its other end with said annular space adjacent the point of introduction of the fluids to be treated, and a pump in said pipe connection.

16. An oil and water separator comprising a vertical cylindrical casing closed at its ends, a cylinder within said casing concentric therewith and open at its ends to the interior thereof, said cylinder being spaced from said casing to define an annular vertically elongated space, means for introducing fluids to be treated into said annular space at a point a substantial distance above the lower end of said cylinder, heating means within said cylinder adjacent the lower end thereof, mechanical baffle means above said heating means, an oil outlet communicating with the interior of said cylinder above said baffle means, means for drawing off water from the bottom of said casing, a ring in said annular space above said fluid introducing means, said ring having its outer periphery fixed to said casing and having its inner periphery provided with an upstanding annular flange spaced from said cylinder to form an annular channel in conjunction with said casing, and means for pumping water from said casing adjacent said heating means to said channel.

17. An oil and water separator comprising a vertical cylindrical casing closed at its ends, a cylinder within said casing concentric therewith and open at its ends to the interior thereof, said cylinder being spaced from said casing to define an annular vertically elongated space, means for introducing fluids to be treated into said annular space at a point a substantial distance above the lower end of said cylinder, heating means within said cylinder adjacent the lower end thereof, a plurality of horizontal spaced baffle units in said cylinder above said heating means, each baffle unit being circular in shape with its periphery slightly spaced from said cylinder and provided with spaced openings substantially throughout its area, said openings providing for the upward passage through said baffle units of oil and oil emulsions and the annular spaces between the baffle units and said cylinder providing for the continuous downward flow of water settling on said baffle units, an oil outlet communicating with said cylinder a substantial distance above the uppermost baffle unit, and means for drawing off water from the bottom of said casing to maintain the water level in said cylinder at a point above the uppermost baffle unit and below said oil outlet.

18. An oil and water separator comprising a vertical cylindrical casing closed at its ends, a cylinder within said casing concentric therewith and open at its ends to the interior thereof, said cylinder being spaced from said casing to define an annular vertically elongated space, means for introducing fluids to be treated into said annular space at a point a substantial distance above the lower end of said cylinder, heating means within said cylinder adjacent the lower end thereof, a plurality of spaced horizontal baffle units in said cylinder above said heating means and each provided with openings therethrough and having its periphery spaced from said cylinder, each baffle unit being formed of a pair of complementary semi-circular plates, means for supporting the plates of each pair, a manhole tube projecting through said casing and said cylinder and elongated transversely in one direction to provide for the insertion and removal therethrough of the individual plates of said baffle units, an oil outlet communicating with said cylinder above the uppermost baffle unit, and means for maintaining the level of water in said cylinder at a point above the uppermost baffle unit and below said oil outlet.

GEORGE E. DAKE.
JOE A. LYNE.

REFERENCES CITED

The following references are of record in the file of this patent:

UNITED STATES PATENTS

| Number | Name | Date |
|---|---|---|
| 1,618,151 | Fisher | Feb. 15, 1927 |
| 2,016,642 | Lincoln | Oct. 8, 1935 |
| 2,156,123 | Mount | Apr. 25, 1939 |
| 2,181,685 | Walker | Nov. 28, 1939 |
| 2,232,948 | Ihrig et al. | Feb. 25, 1941 |
| 2,273,915 | Wellman | Feb. 24, 1942 |
| 2,326,384 | Mount | Aug. 10, 1943 |
| 2,342,950 | Lovelady et al. | Feb. 29, 1944 |